United States Patent [19]

Allen et al.

[11] Patent Number: 4,707,704

[45] Date of Patent: Nov. 17, 1987

[54] CONTROL SYSTEM AND METHOD FOR HANDLING SHEET MATERIALS

[75] Inventors: David Allen, Worcester, Mass.; Arthur Cleary, Derry, N.H.

[73] Assignee: Advanced Color Technology, Inc., Cambridge, Mass.

[21] Appl. No.: 861,264

[22] Filed: May 9, 1986

[51] Int. Cl.[4] ........................ G01D 9/00; G03G 15/00; H04N 1/22

[52] U.S. Cl. ........................................ 346/24; 346/136; 346/140 R; 355/3 DR; 358/304

[58] Field of Search .................. 346/24, 136, 137, 138, 346/1.1, 140; 355/3 DR, 16, 14 D, 3 DD; 358/304; 242/67.3

[56] References Cited

U.S. PATENT DOCUMENTS

| | | | |
|---|---|---|---|
| 3,829,208 | 8/1974 | van Meijel et al. | 355/16 X |
| 4,122,497 | 10/1978 | Suzuki et al. | 346/24 X |

OTHER PUBLICATIONS

Slaughter, G. T., "Ink Jet Printer/Copier", *IBM Technical Disclosure Bulletin,* vol. 21, No. 2, Jul. 1978, pp. 698–699.

*Primary Examiner*—Clifford C. Shaw

*Assistant Examiner*—Linda M. Peco

*Attorney, Agent, or Firm*—E. T. Barrett

[57] ABSTRACT

An ink jet printer with a roll of paper stored within an imaging drum. The paper through a longitudinal opening in the drum to the outside, passes around the drum, where it is held in place during the imaging process, and then ejected from the drum to the desired length and cut off by a cutter that extends the full width of the paper. While the imaged sheet is being ejected from the drum, the next length of paper is drawn from the interior of the drum and around the outside of the drum in position for the next imaging operation. The length of paper that remains projecting from the drum after the imaged paper has been cut off is then withdrawn into the interior of the drum through the longitudinal opening in the drum surface until only a short stub, which will not interfere with the subsequent imaging operation, remains protruding from the drum. Precise movement of the paper is under the control of a counter that is responsive to the paper movement. This counter movement also provides an indication in the event the paper jams and warns when the supply of paper within the drum is nearing its end. The entire operation is automatic under the control of a central processor unit.

11 Claims, 19 Drawing Figures

CONTROL SYSTEM AND METHOD FOR HANDLING SHEET MATERIALS

BACKGROUND OF THE INVENTION

1. Field of the Invention

This invention relates to paper supply mechanisms of the type that are used with ink jet printers, facsimile machines, copiers and the like. More particularly it relates to methods and apparatus for controlling the movement of sheet materials in a roll feed mechanism in which a supply of paper, or other sheet material, is stored within an imaging drum and is arranged to feed to the outer surface of the drum where writing or imaging operations occur.

2. Brief Description of the Prior Art

Countless arrangements have been used to supply paper and other sheet materials automatically to many different types of reproducing machines. In some of these, cut sheets are fed individually from a supply stack, but it is difficult to feed the sheets onto and from the imaging drum, and complex mechanisms are usually required to perform these operations. In other feed systems, paper is fed from a continuous roll into the reproducing equipment and is cut into individual sheets either before or after the imaging operation. In some instances, the continuous supply of paper is cut into individual sheets of the desired length before being fed onto the drum in an effort to overcome the problems associated with feeding a continuous supply onto the drum.

In such a system it is important that the imaged sheet from the supply roll be separated by a smooth cut and not by a tear or a cutter that leaves a jagged edge. The storage of sheet materials in an imaging drum is described in a number of U. S. Pat. Nos. including 866,624 Collier; 4,239,375 to Eisben et al.; 4,231,652 to Moser et al., 4,102,570 to Shimoda; 4,097,138 to Kingsley; 4,068,992 to Buchel, 626,556 to Nolan; and 3,829,208 to van Meljel. None of these patents shows any arrangement for providing a clean cut of the sheet material. In all but the last patent, however, the sheet material is a web used in an intermediate step in a copying process and is returned to the interior of the drum after usage. Those patents disclose no mechanism to shear the sheet material. In the Meljel patent, the used web is either torn off or cut with a jagged edge.

None of these patents discloses any means for monitoring the movement of the sheet material, detecting jams, or indicating the approaching end of the supply of material within the drum.

SUMMARY OF THE INVENTION

A roll of paper, or other sheet material, is stored on a supply spool mounted within an imaging drum. The paper feeds from the supply spool through a longitudinal opening in the drum to the outside, passes around the drum, where it is held in place during the imaging process, and then ejected from the drum to the desired length and cut off. While the imaged sheet is being ejected from the drum, the next length of paper is drawn from the interior of the drum and around the outside of the drum in position for the next imaging operation. The length of paper that remains projecting from the drum after the imaged paper has been cut off is then withdrawn into the interior of the drum through the longitudinal opening in the drum surface until only a short stub, which will not interfere with the subsequent imaging operation, remains protruding from the drum. With this arrangement, the cutting mechanism may be spaced a significant distance from the imaging drum, making it convenient to use a cutting edge that extends the full width of the sheet material Precise movement of the paper is under the 19. control of a counter that is responsive to the paper movement. This counter movement also provides an indication in the event the paper jams and warns when the supply of paper within the drum is nearing its end. The entire operation is automatic under the control of a central processor unit.

DESCRIPTION OF THE PREFERRED EMBODIMENT

The ink jet printer described here is described in somewhat greater detail in the co-pending application cf Arthur Cleary and Calvin Winey, Ser. No. 06/861/594 entitled "Method and Apparatus for Handling Sheet Materials" filed of even date herewith, and the applications referenced therein, and assigned to the same assignee as the present application.

Figure 1:
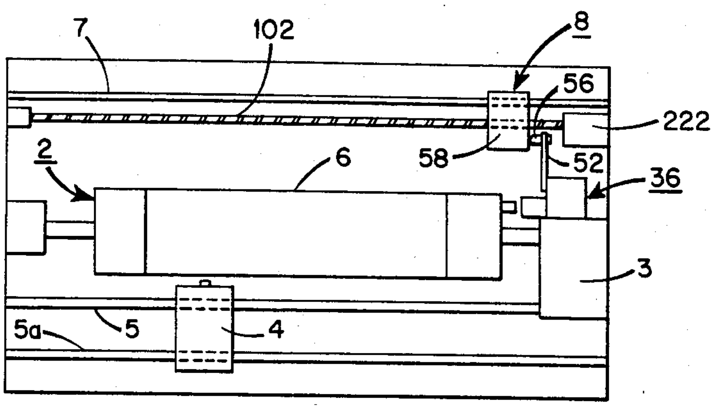
FIG. 1 is a diagrammatic top view of an ink jet printer embodying the invention.

As shown in FIG. 1, the ink jet printer includes a rotatable drum, generally indicated at 2, that is driven by a stepping motor 3. An ink jet printing head assembly 4 is mounted for longitudinal movement along tracks 5 and 5*a*. The imaging paper or other sheet material 6 envelopes the outer surface of the drum 2 during the imaging process and, at its conclusion, is ejected across a cutter bar 7 where it is sheared by a cutter mechanism, generally indicated at 8. The term "sheet material" as used in this application includes the various flexible media on which images can be recorded, such as paper, transparencies and photographic materials, which are supplied in long lengths. While the drum 2 rotates, the print head 4 moves longitudinally along the drum 2 tracing a spiral path on the paper 6 to produce the desired image. As the completed image is ejected, a length of unused paper is simultaneously drawn from the interior of the drum 2 and positioned around the outside of the drum.

The Paper Drive Mechanism

Figure 2:
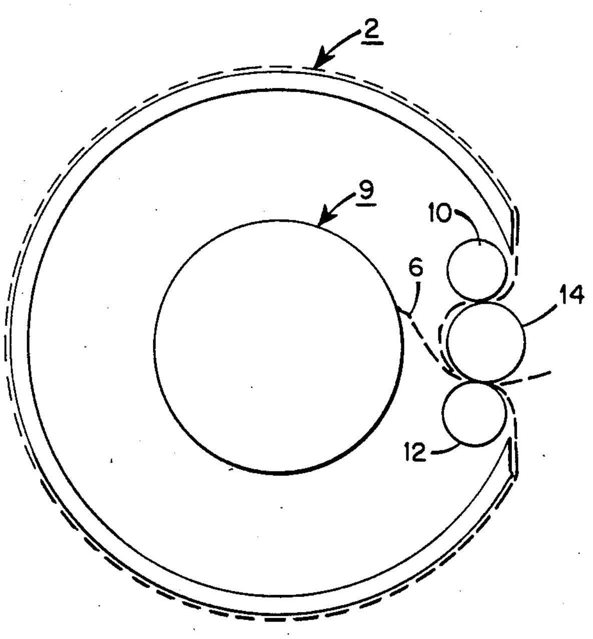
FIG. 2 is a diagrammatic illustration of the paper drive rollers.
Figure 3:
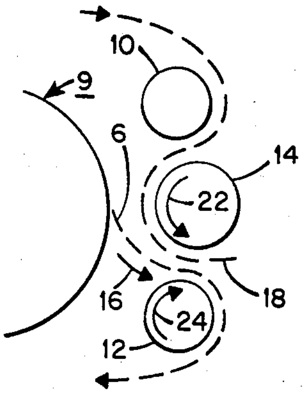
FIGS. 3 and 4 are diagrammatic views with the paper drive rollers separated for purposes of explanation.
Figure 4:
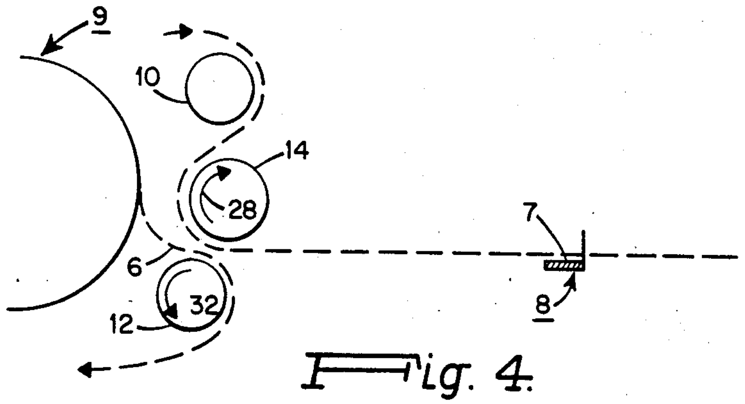

As illustrated diagrammatically in FIGS. 2, 3 and 4, the rotatable drum 2 supports within it a rotatably mounted spool, generally indicated at 9, that carries a roll of sheet material 6, which in this example is paper. The drum 2 also carries three rollers: an idler roller 10, a tension roller 12, and a drive roller 14. The idler roller 10 and and the tension roller 12 are each biased toward the drive roller 14 to provide traction for the movement of the paper and for the measurement of such movement The path of the paper around and between these rollers is illustrated in FIGS. 3 and 4 where the rollers 10, 12 and 14 have been spaced apart only for the purpose of illustration. Although the idler roller 10 forms part of this preferred embodiment, and has numercus advantages as will be noted later, it is not an essential element for the paper transfer functions.

The paper 6 from the spool 9 passes between the drive roller 14 and the tension roller 12, as illustrated by the arrow 16, partially around roller 12 and then around the outer circumference of the drum 2. After passing around the surface of the drum 2, the paper passes between the idler roller 10 and the drive roller 14, partially around the inner surface of the roller 14 and then between the rollers 12 and 14 where one surface of the paper engages the roller 14 and the other surface engages the length of paper already between the same pair of rollers. A short stub 18 (FIG. 3) of paper extends from between the rollers 12 and 14.

Figure 5:
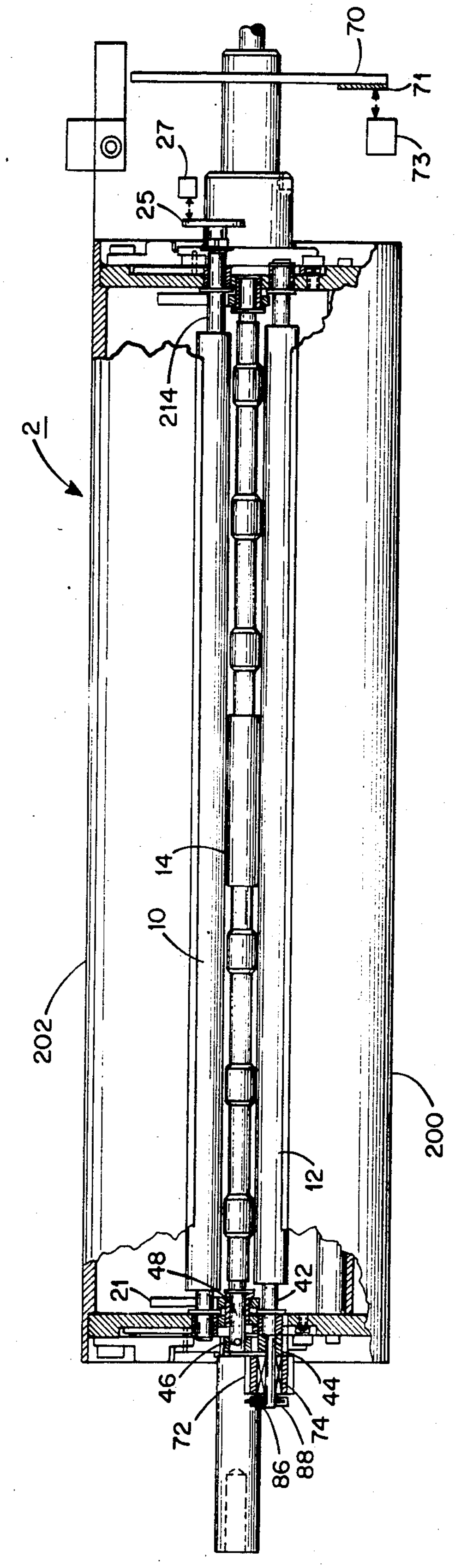
FIG. 5 is an elevational view of the imaging drum, partially cut away to show the interior construction.

In that condition, the paper 6 is tensioned around the drum 2 and the rollers 12 and 14 are locked in position. The imaging process is then performed to produce an image on the surface of the paper 6 on the drum. When the imaging is completed, the drum is stopped at a predetermined rotary position and a drive mechanism, to be described later, is connected to the roller 12. To eject the imaged paper, the rollers 12 and 14 are driven in the directions indicated by the arrows 22 and 24 in FIG. 3. This action causes additional paper to be drawn from the spool 9 and travel around the drum while the rollers 12 and 14 eject the imaged paper. When a sufficient length of paper has been ejected, the paper extends to the cutter mechanism 8 in FIG. 4, which may be located some distance from the drum 2. The length of the paper ejected may be measured by any appropriate mechanism such as by the rotation of a disk 25 (FIG. 5) that is secured to and rotates with the idler roller 10. The disk 25 has radial non-reflecting stripes that are detected and counted by an infrared detector 27. The paper is then sheared by the cutter mechanism 8 to separate the imaged portion. At this time, a length of paper extends from the drum 2 to the cutter bar 7. The drive mechanism is arranged to drive the rollers 12 and 14 in the directions indicated by the arrows 28 and 32 in FIG. 4. This action draws the paper back between the rollers 12 and 14, partially around the surface of roller 14, between roller 14 and the idler roller 10, around the outer surface of the drum 2, and again between the rollers 12 and 14 into the interior of the drum. This motion is continued until the paper is withdrawn to again leave the short stub 18 projecting from between rollers 12 and 14 as measured by reverse rotation of the disk 25.

During the imaging process, it is important that the paper 6 be in close contact with the surface of the drum 2. This is achieved by locking the roller 14 and driving the roller 12 in the direction indicated by the arrow 32 in FIG. 4. The driving surfaces of the rollers 12 and 14, which may be rubber, have relatively high friction so that when the roller 12 is driven in the reverse direction indicated by arrow 32, it tensions the paper around the drum by returning a short length of paper into the drum while the paper at the other end of the drum surface is restrained because of the surface friction of the locked drive roller 14. During this motion, the stub 18 is prevented from being withdrawn into the drum because the friction between the surface of the roller 14, which is locked, and the paper is substantially greater than the friction between the two adjacent surfaces of the paper. During and subsequent to this tensioning process, the roller 12 is driven through a one-way clutch, to be described later, which permits rotation of the roller 12 only in the direction of the arrow 32 relative to the gear that drives this roller. Thus, when the tensioning action is complete and the drive is released from the roller 12, the paper remains under tension. The tensioning process is not controlled by the length of the paper withdrawn, but instead the tensioning roller 12 is merely allowed to operate for some prefixed period of time, for example, five seconds. Alternatively, a tension responsive switch can be used to disconnect the drive.

When the tensioning process has been completed, the drive mechanism is disconnected from the drum which is then rotated to produce the next imaging sequence. This arrangement permits an automatic continuing sequence of imaging processes while eliminating many of the problems of handling the paper and at the same time reducing the cost and simplifying the paper-handling equipment.

FIGS. 5, and 8–13 illustrate a drive assembly, generally indicated at 36, (FIG. 10) for the rollers 12 and 14. The position of this drive assembly controls the three operating modes: the rest mode during which the drum 2 is free to rotate; the drive mode for ejecting and retracting the paper 6; and the tensioning mode when the paper is tensioned around the drum 2.

During the rest mode, the drive assembly 36 is disconnected from the roller 12 by moving the drive mechanism to its position farthest removed from the drum 2 leaving the drum free for rotation. This is illustrated by the diagrammatic representation of FIG. 8 in which the coupling is viewed from the front of the printer. In the driving mode, the drive assembly is moved to its position nearest the drum 2 and is arranged to drive rollers 12 and 14, mounted on shafts 42 and 48 respectively, (FIG. 5) by means of a spur gear 44, carried by the shaft 42, and a similar gear 46 carried by the shaft 48 of the drive roller 14.

In the tensioning mode, the drive assembly 36 is positioned at an intermediate station where it is arranged to drive the roller 12 while the roller 14 is locked against reverse rotation by the drive assembly.

When the drum 2 is rotating, as during the imaging mode, the roller 12 is disconnected from the drive assembly 36 by a lever 52 (FIGS. 10 and 12–14) which is hinged at 54 on one end and carries a bumper 56 on the opposite end. The position of the lever 52 is controlled by the position of a housing 58 (See also FIGS. 1, 14 and 15) that carries the cutter mechanism 8, to be described later.

Figure 11:
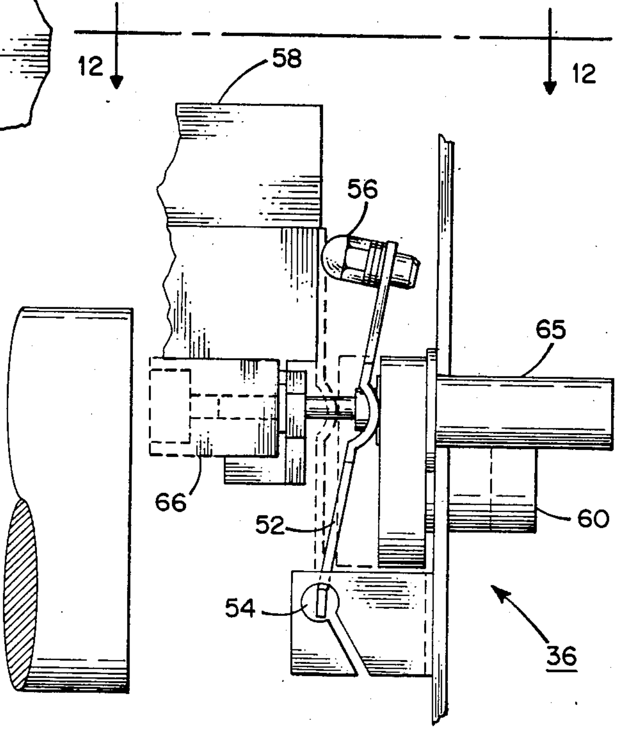
FIG. 11 is a view along line 11—11 of FIG. 10.
Figure 12:
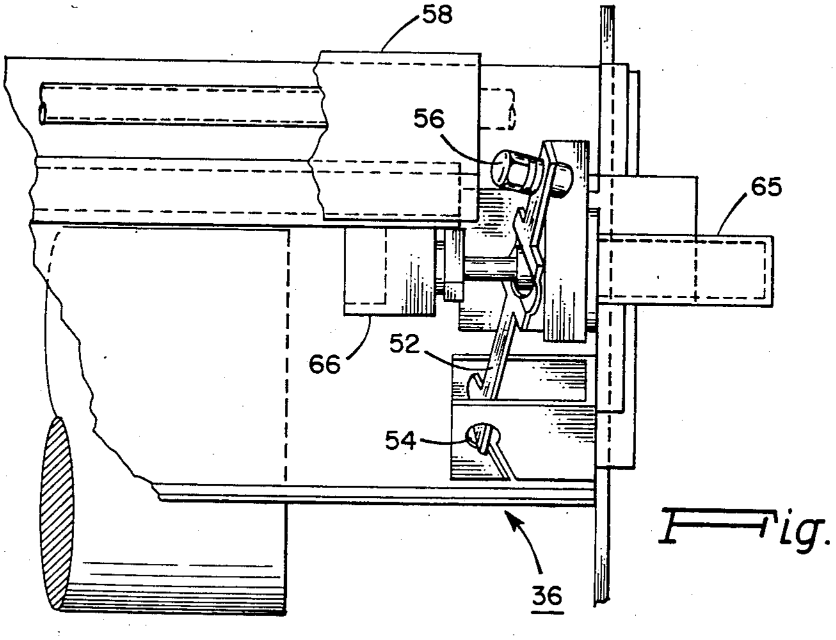
FIG. 12 is a top view of the assembly along line 12—12 of FIG. 11.
Figure 19:
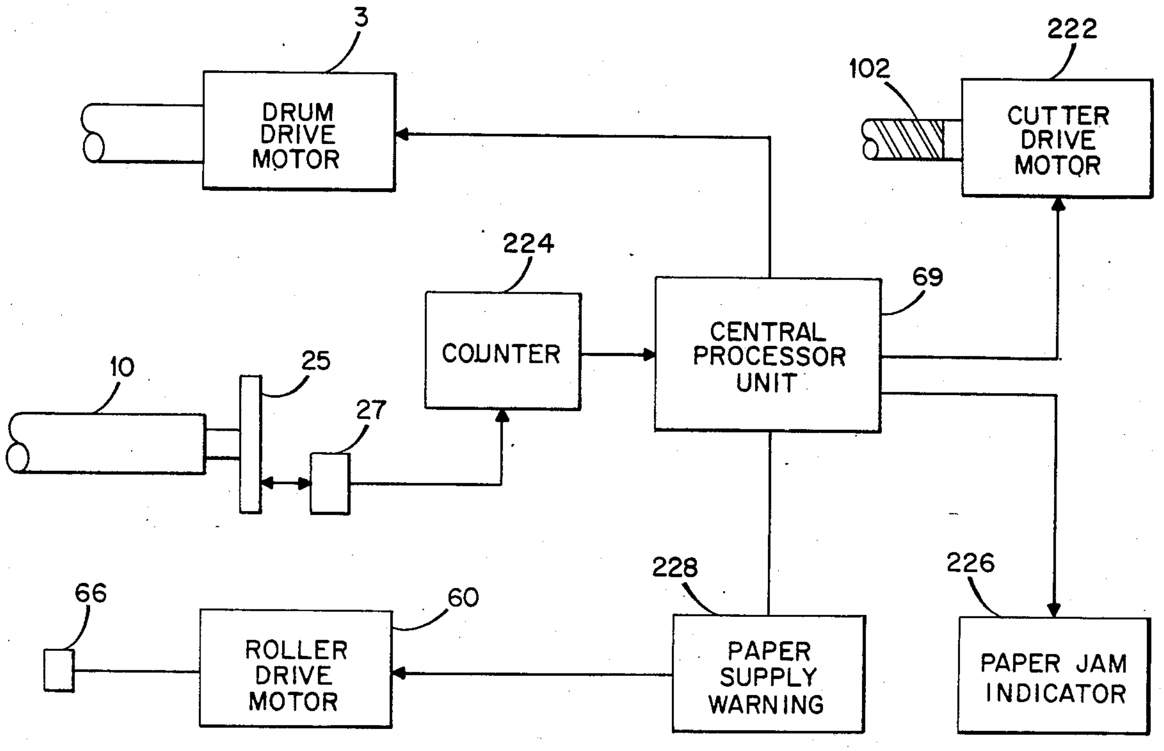
FIG. 19 is a block diagram illustrating the operation of the central processor unit.

When the printer is in the imaging mode and the drum 2 is rotating, the lever 52 retains a motor 60 and its associated assembly in its rest position, far right as viewed in FIG. 11. In this rest position, a plunger 62 (FIG. 9), controlled by the lever 52, maintains a spring 64 under maximum compression within a stationary mounting case 65. A drive sleeve 66 connected to the motor 60, and which contains three splines 68 (FIGS. 9 and 13) positioned circumferentially 120° apart within the sleeve 66, is spaced from the drum 2 leaving it free for rotation. The drum 2 is driven by the direct drive stepping motor 3, as illustrated by FIG. 19, which by means of a central processor control unit 69 stops the drum 2 at the end of the imaging cycle. The drum is then caused to rotate slowly until a radial mark 71, carried by a disk 70 (FIG. 5), which rotates with the drum 2, indicates through an infrared detector 73 that the drum 2 is in the correct position for coupling the drive 36 to the roller 12.

Figure 8:
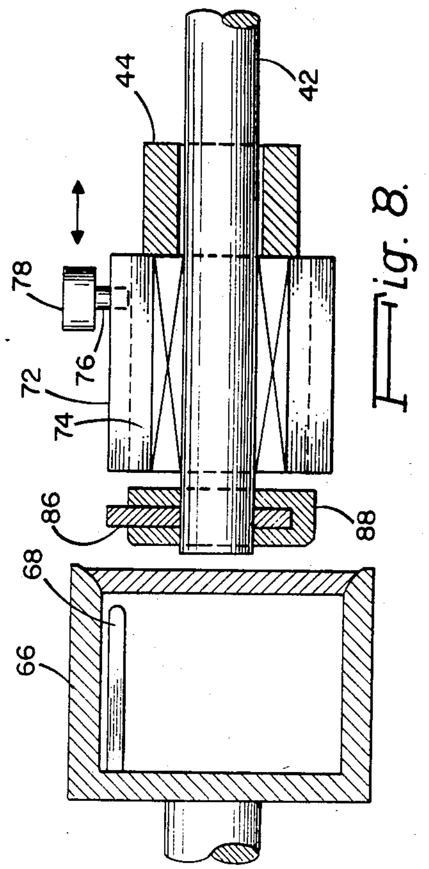
FIG. 8 is an enlarged diagrammatic sectional view of the drive coupling arrangement for illustrating its operation.
Figure 13:
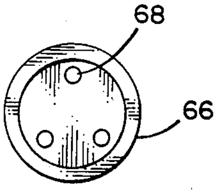
FIG. 13 is a partial view along line 13—13 of FIG. 9.
Figure 10:
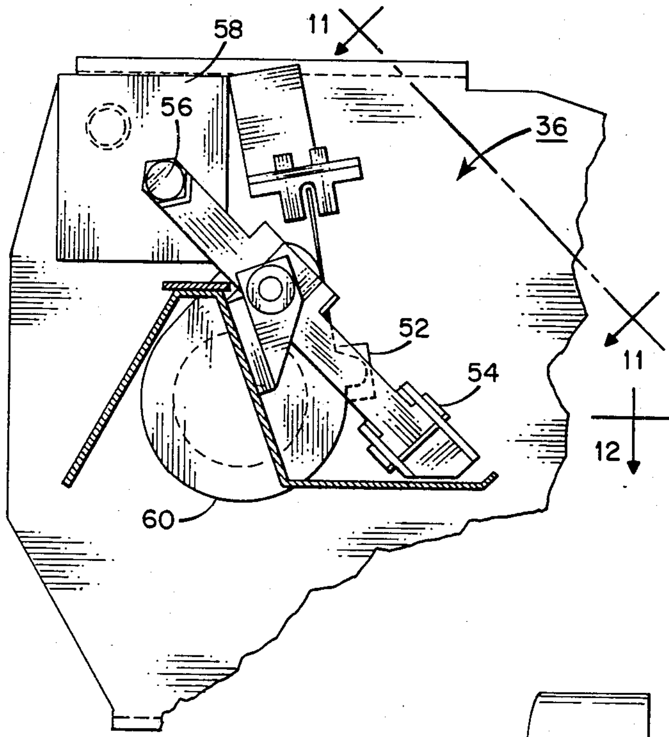
FIG. 10 is an end view along line 10—10 of FIG. 9.

When the imaging operation is completed and the drum 2 has been stopped in its drive position, the housing 58 is moved to the drive position that causes the drive motor assembly 36 to be coupled to the roller 12 through the sleeve 66 to eject the imaged paper 6. In this position, the splines 68 engage the teeth of a spur gear 72 (FIGS. 5 and 9) that extends within the sleeve 66. The spur gear 44 is secured to gear 72 but is not secured to the shaft 42 other than through the gear 72. As best shown in FIGS. 8 and 13, a collar 88, that forms the end of the mechanism by which rollers 12 and 14 are driven, and the interior of the sleeve 66 are tapered so that the drive sleeve 66 is brought into engagement with the gear 72 in spite of slight variations in the rotary position of the drum 2. The gear 72 (FIGS. 5 and 8) is secured to the shaft 42 that carries the roller 12 through a conventional one-way clutch, diagrammatically illustrated at 74, that permits rotation of the shaft 42 in the direction of the arrow 32 of FIG. 4 relative to the gear 72 but prevents relative rotation in the opposite direction.

Figure 6:
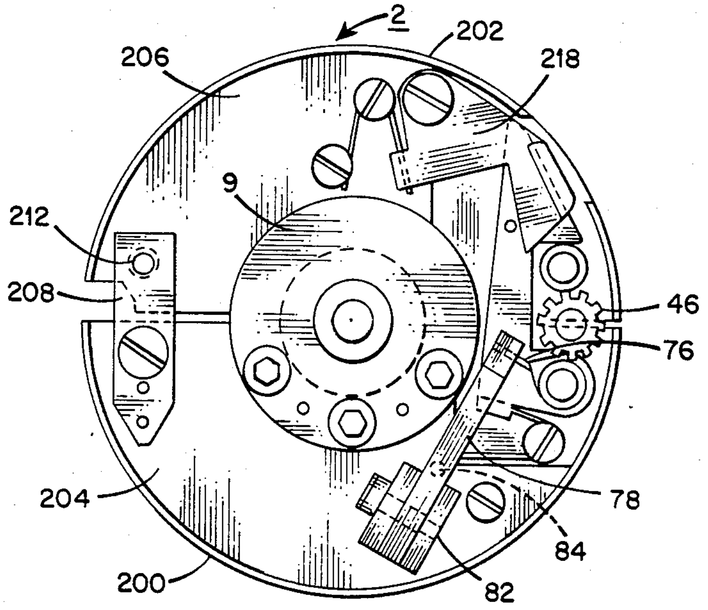
FIG. 6 is an end view of the imaging drum.

The gear 72 is normally locked from rotation by a pin 76 (FIGS. 6 and 8) carried in the end of an arm 78 and which extends into the space between adjacent teeth on the gear 72. The arm 78 is hinged at 82 (FIG. 6) and is biased toward the locking position by a coil spring 84 positioned between the the end of the drum 2 and the arm 78. In the position when the gear 72 is engaged by the drive sleeve 66, the end of the sleeve 66 abuts the arm 78 and moves it toward the right, as viewed in FIG. 8, so that the pin 76 no longer engages the gear 72.

When the paper has been ejected to the desired length, as determined by the counter disk 25 on the idler roller shaft 48, the drive motor 60 is stopped, which prevents movement of the rollers 12 and 14 while the paper is sheared by the cutter mechanism 8.

After the paper has been sheared, the motor assembly 36, while in the drive position, is driven in the reverse direction, by reversing the motor 60, to withdraw the paper, under the control of the counter disk 25, until only the short stub 18 projects from between the rollers 12 and 14. The housing 58 is then moved, against the force of the spring 64 (FIG. 9), to move the lever 52 and the motor assembly 36 to its intermediate or tensioning position. In this position, the end of the sleeve 66, which abuts the lever 78, has moved away from the drum 2 allowing the pin 76 (FIGS. 6 and 8), to lock the roller 14 by engaging the teeth of the gear 72, while the roller 12 is driven in the direction of the arrow 32 (FIG. 4). This is accomplished by a drive pin 86 (FIGS. 5 and 8) that extends through a collar 88 in the end of the shaft 42 of the roller 12. One of the splines 68 in the drive sleeve 66 engages the drive pin 86, but not the teeth of gear 72, while the gear 72, and thereby the gears 44 and 46 and the roller 14, are locked by the locking pin 76. In this state, while the gear 72 is locked, shaft 42 is free to rotate in the direction of arrow 32 of FIG. 4 because of the one-way clutch 74.

The Paper Shear Mechanism

Figure 14:
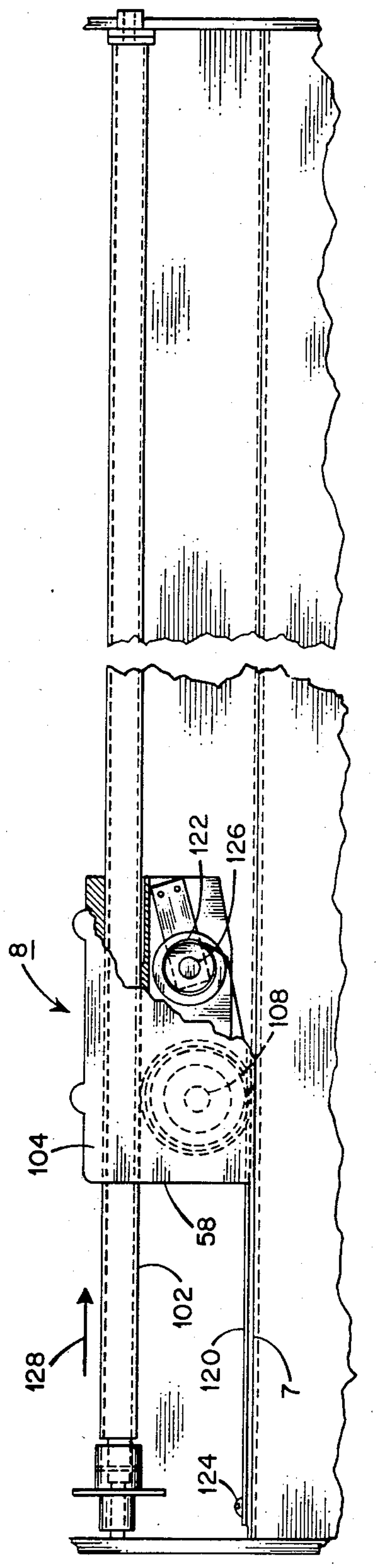
FIG. 14 is a front view, partially cut away, of the mechanism for shearing the paper after each imaging operation.
Figure 15:
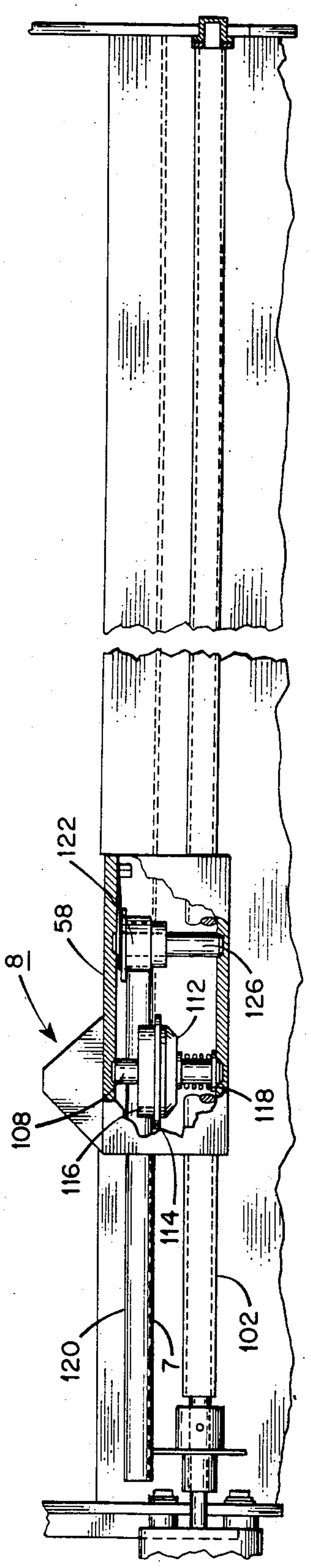
FIG. 15 is a top view, partially cut away, of the cutting mechanism of FIG. 14.

The paper shear mechanism 8 is shown in more detail in FIGS. 14 and 15. It is driven horizontally by a screw 102 or some other means that engages a plastic drive nut 104 secured within the cutter housing 58. A shaft 108 extends between opposite sides of the housing 58 and carries a plastic support washer 112, a cutter wheel 114 and a resilient drive wheel 116 that is secured to the cutter wheel 114. The drive wheel 116 is maintained under pressure against the top surface of the cutter bar 7. The cutter wheel 114 is maintained in pressure engagement with a side edge of the cutter bar 7 by a coil spring 118. As the shear mechanism 8 is moved longitudinally by rotation of the screw 102, or some other mechanism, the drive wheel 116 causes the cutter wheel 114 to rotate and shear the paper 6.

To maintain the paper in firm contact with the cutter bar 7 and prevent wrinkling, a length of a flat metal spring 120 is arranged to overlay the paper during the shearing operation. One end of the spring is secured to the upper surface of the cutter bar 7, as by a screw 124 (FIG. 16), and the other end portion forms a coil 122 that is rotatably mounted on a support 126 carried by the housing 58. As the cutter assembly 8 is moved in the direction of the arrow 128 to shear the paper, the spring 120 uncoils to lay on the surface of the paper. The spring is pressed against the paper by the force of the drive wheel 116 so that the paper is prevented from moving laterally ahead of the cutter assembly. When the shear is completed and the cutter assembly returns to its home position, the flat spring 120 returns to the coil 122.

The Imaging Drum

Figure 7:
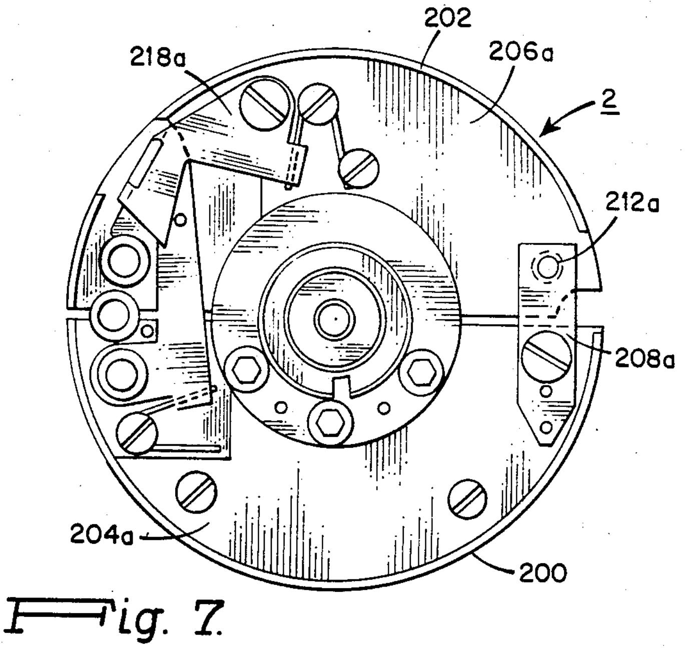
FIG. 7 is a view of the opposite end of the drum.
Figure 9:
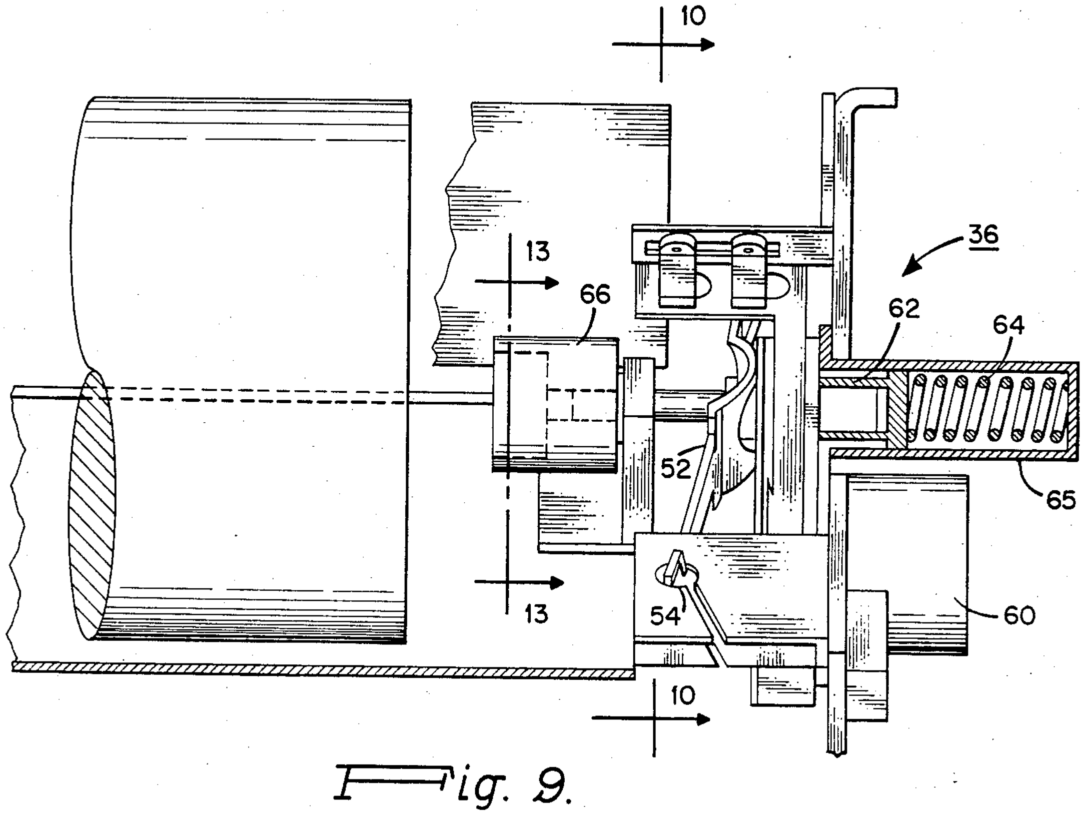
FIG. 9 is a partial sectional view showing the driving and control arrangement for the paper handling mechanism as viewed from the rear of the printer.

Access to the interior of the drum 2 may be by any appropriate means, such as by removing one end of the drum or, as described in the Cleary application, access may be provided by forming the drum of two hinged sections. The drum 2 (FIGS. 5-7) is formed of a cylindrical shell of two halves: a lower section 200 and a cover section 202. The lower section 200 of the drum 2 is provided at its ends with semicircular end plates 204 and 204*a* and the cover section 202 is provided with similar end plates 206 and 206*a*. The end plate 206 is hinged to the end plate 204 by an arm 208 secured to the plate 204 which carries a hinge pin 212. At the opposite end the cover section is secured to the lower section by a similar arrangement of arm 208*a* and hinge pin 212*a*. The two sections are separated by a longitudinal slot by the distance necessary to permit the hinge action.

The idler roller 10 comprises a shaft 214 covered by a rubber sleeve and is mounted for free rotation in the end plates 206 and 206*a* of the cover section 202. The covering on shaft 214 may be any resilient material having a relatively high coefficient of friction to insure that the roller 10 will be rotated by any movement of the paper between the roller 10 and the drive roller 14. The rubber covering extends substantially the full length of the shaft 214 and is of uniform diameter.

The shaft 48 of the drive roller 14 is rotatably supported by two arms 218 and 218*a* which are hinged respectively to the end plates 206 and 206*a* of the cover drum section 202. Only the center portion of the shaft 48 is covered with a resilient sleeve 220, for example about two inches in length, that engages the rollers 10 and 12 when the cover section 202 is in its closed position.

The shaft 42 of the tensioning roller 12 is mounted in the end plates 204 and 204*a* of the lower drum section 200. This roller is similar in construction to the idler roller 10 and carries a resilient sleeve that extends most of the distance between the end plates 204 and 204*a*.

Within the drum, the paper supply spool 9 is supported by any suitable means so that it can be readily replaced and is free to rotate to allow the paper to unwind to the outer surface of the drum.

The Operating System

Figure 16:
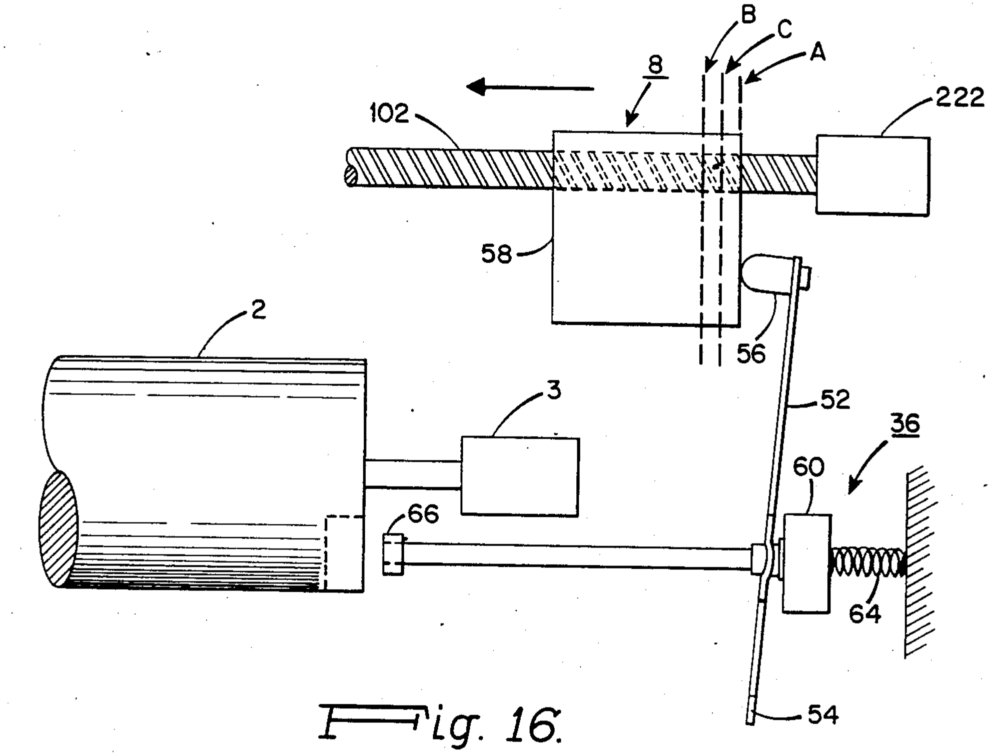
FIGS. 16, 17, and 18 are diagrammatic views for explaining the operation.

FIGS. 16–19 illustrate diagrammatically the operational controls. FIG. 16 represents the condition when fresh paper has been positioned on the drum 2 and another image is to be created. The housing 58, driven by a motor 222, has forced the bumper 52 to its far right position, as viewed in FIG. 16, against the force of the spring 64. In this position, the drive sleeve 66 is disconnected and spaced from the drum 60.

Figure 17:
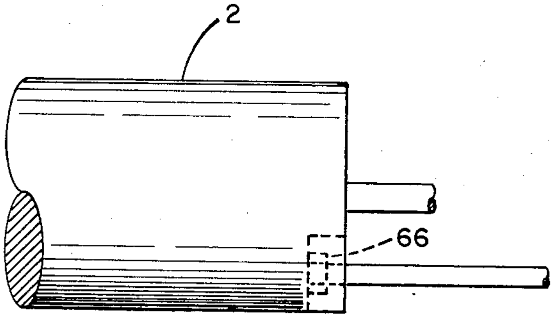
Figure 18:
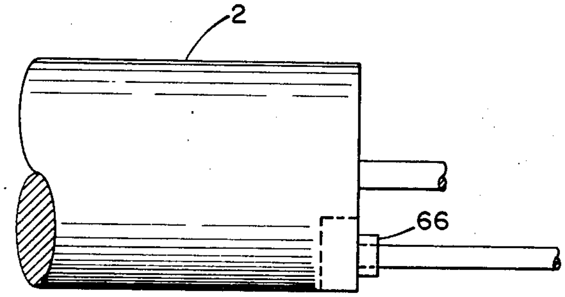

The drive motor 3 is then energized by a central processor unit 69 to cause the drum to rotate. At the same time, the mechanism (not shown) for moving the head and controlling the ink jets in accordance with the desired program are also activated by the central processor unit 69. The drum continues to rotate until the printing head has completed the image, which is determined in accordance with the particular imaging program. The central processor unit 69 then stops the rotation of the drum 2, positions it for coupling to the roller drive assembly 36 and then activates the motor 222 to drive the screw 102, or other drive mechanism, and cause the housing 58 to move to position "B" in which the tip of the bumper 56 lies in the plane indicated by the broken line B in FIG. 16. In this position, the drive sleeve 66 is fully engaged with the drum 2, as indicated by FIG. 17, and both rollers 12 and 14 are driven by the motor 60 in the directions of the arrows 22 and 24 in FIG. 3. The imaged paper is then ejected from the drum 2 while the surface of the drum 2 is replenished with fresh paper. When a predetermined length of paper has been ejected, as measured by a counter 224 connected to the infrared detector 27 which measures the rotation of the disk 25 and idler roller 10, the processor unit 69 deenergizes the roller drive motor 60 and energizes the cutter drive motor 222 to shear the imaged paper. The motor 222 is then reversed returning the housing 58 to position "B", placing the tip of the bumper 56 again in the plane indicated by the broken line B. The motor 60 is then energized in the reverse direction to withdraw the length of paper between the drum 2 and the cutter bar 7 into the drum. The amount withdrawn is again measured by the rotation of the idler roller 10 through the counter 224 which stops the motor 60 when only the stub 18 is left protruding from between the rollers 12 and 14. The central processor unit 69 then again activates the motor 222 to move the housing to its "C" position in which the tip of the bumper lies in the plane indicated by the broken line C in FIG. 16. In this intermediate position, indicated by FIG. 18, the roller 14 is locked from rotation, as previously described, and the roller 12 is driven by motor 60 in the direction of the arrow 32 to tension the paper around the drum 2. The motor 60 is energized for approximately 5 seconds or for a time period sufficient to insure tensioning of the paper.

When the paper has been tensioned around the drum, the printer is ready for the next imaging operation. The processor unit 69 then moves the housing 58 to its "A" position and the entire process is repeated.

If during the process of ejecting the imaged paper from the drum, the paper should jam, the roller drive motor 60 will continue to be energized causing the rollers to slip on the surface of the paper, but the counter 224 will indicate that the idler roller 10 is not turning. This condition is sensed by the central processor 69 and illuminates a paper jam indicator 226.

To indicate when the supply of paper, or other sheet material, is nearing its end, the central processor unit 69 retains a memory of the net movement of the paper from the drum 2 by totalling the positive and negative impulses from the detector 27 and comparing that number with a predetermined number stored in the processor 69. When the difference between the two numbers becomes less than a pre-set value (based on the quantity of paper initially loaded in the drum), a paper supply warning indicator 228 is activated.

We claim:

1. In an ink jet printer for producing imaged sheets of a predetermined length having
   - an imaging drum, and
   - a supply of sheet material within said drum,
   - sheet material control means comprising
     - first and second rollers carried by said drum, said sheet material extending around the exterior of said drum and thence between said first and second rollers,
     - reversible drive means coupled to said rollers for operating in a forward direction to draw said sheet material from within said drum around the exterior thereof and thence away from said drum, and operating in a reverse direction to withdraw said sheet material toward said drum,
     - cutter means spaced from said drum and arranged to receive and shear sheet material ejected from said drum,
     - distance measuring means responsive to movement of said sheet material,
     - means energizing said drive means to move said sheet material, and
     - means under the control of said distance measuring means arranged to stop said drive means when said sheet material has moved a predetermined distance approximately equal to the said predetermined length of one of said imaged pages plus the distance between the surface of said drum and said cutter means.

2. Sheet material control means as claimed in claim 1 wherein
   - said means energizing said drive means energizes said drive means in its forward direction to eject said sheet material toward said cutter means,
   - said means energizing said drive means subsequently energizes said drive means in its reverse direction, and said means under the control of said distance measuring means stops said drive means when said sheet material has moved a predetermined distance approximately equal to the distance between the surface of said drum and said cutter means in the reverse direction.

3. In an ink jet printer having
an imaging drum, and
a supply of sheet material within said drum,
sheet material control means comprising
first and second rollers carried by said drum, said sheet material extending around the exterior of said drum and thence between said first and second rollers,
reversible drive means coupled to said rollers for operating in a forward direction to draw said sheet material from within said drum around the exterior thereof and thence away from said drum, and operating in a reverse direction to withdraw said sheet material toward said drum,
cutter means spaced from said drum and arranged to receive and shear sheet material ejected from said drum,
measuring means responsive to movement of said sheet material including
a third roller engaging and rotated by the surface of said sheet material, and including a counter for measuring the rotational movement of said third roller,
means energizing said drive means to move said sheet material, and
means under the control of said measuring means arranged to stop said drive means when said sheet material has moved a first predetermined distance.

4. Sheet material control means as claimed in claim 3 wherein
said sheet material is maintained under pressure between said second and third rollers.

5. Sheet material control means as claimed in claim 4 wherein
said sheet material extends from within said drum, thence between said first and second rollers, thence around the exterior of said drum, thence between said second and third rollers, and thence again between said first and second rollers.

6. Sheet material control means as claimed in claim 5 including
alert indicator means responsive to the movement of said first roller and simultaneous non-movement of said third roller therby to indicate an operational problem.

7. Sheet material control means as claimed in claim 5 wherein
said measuring means measures the net movement of said sheet material in a direction away from said drum, and including
means for indicating when said net movement reaches a predetermined value.

8. In an ink jet printer of the type having
an imaging drum,
means for rotating said drum,
a supply of sheet material within said drum, and
a print head arranged to scan the surface of said drum,
a sheet material transporting and measuring system comprising
first, second and third rollers carried by said drum,
means maintaining said first and third rollers biased toward said second roller,
said sheet material extending from within said drum, between said first and second rollers, thence around the exterior of said drum, thence between said second and third rollers, and thence again between said second and third rollers,
means for measuring the movement of said sheet material including means responsive to the rotational movement of said third roller,
cutter means spaced from said drum and extending transversely across the path of said sheet material for separating the imaged portion of said sheet material,
drive means coupled to said first and second rollers and operating in a forward direction to transport said sheet material from the interior of said drum, around the exterior thereof and thence toward said cutter means, and in a reverse direction to withdraw sheet material from said cutter means toward said drum,
counter means coupled to said third roller for measuring the movement of said sheet material, and
means under the control of said counter means for interrupting the operation of said drive means in its forward direction upon movement of a predetermined length of sheet material, and for interrupting the operation of said drive means in its reverse direction upon movement of a shorter predetermined length of said sheet material.

9. Apparatus as claimed in claim 8 including
alert indicating means responsive to the energization of said drive means in its forward direction and simultaneous non-movement of said third roller thereby to indicate a problem in the transport system.

10. In an ink jet printer for producing imaged sheets of a predetermined length of the type having
an imaging drum and a supply of sheet material within said drum, and
sheet cutter means spaced from said drum, the method comprising the steps of
providing a sheet material drive,
energizing said drive in a forward direction to eject said sheet material from said drum,
measuring the movement of said sheet material,
stopping said drive means when a first predetermined length of sheet material approximately equal to said predetermined length of one of said imaged sheets plus the distance between the surface of said drum and said sheet cutter means,
shearing said sheet material along a line spaced from said drum,
energizing said drive in a reverse direction to withdraw the sheared end of the sheet material toward said drum,
measuring the movement of the sheet material toward said drum, and
stopping said drive means when a second predetermined length of the sheet material approximately equal to the distance between the surface of said drum and said sheet cutter means has been withdrawn.

11. The method as claimed in claim 10 including the additional steps of
sensing the energization of said drive,
simultaneously sensing the movement of said sheet material, and
providing an indication of a malfunction when said drive is energized and said sheet material is stationary.

* * * * *